United States Patent [19]

Bonga

[11] Patent Number: 4,563,800
[45] Date of Patent: Jan. 14, 1986

[54] ELECTRODE TOOL STORAGE MAGAZINE

[75] Inventor: Benno I. Bonga, Crans, Switzerland

[73] Assignee: Ateliere des Charmilles, S.A., Geneva, Switzerland

[21] Appl. No.: 519,834

[22] Filed: Aug. 3, 1983

[30] Foreign Application Priority Data

Aug. 6, 1982 [CH] Switzerland ............... 4741/82

[51] Int. Cl.[4] ............................................ B23Q 3/157
[52] U.S. Cl. ............................... 29/26 A; 29/568; 219/69 R; 408/35
[58] Field of Search ............ 29/568, 26 A; 219/69 W, 219/69 R; 408/35

[56] References Cited

U.S. PATENT DOCUMENTS

| 3,191,260 | 6/1965 | Jorgensen | 408/35 |
| 3,263,300 | 8/1966 | Schatzman et al. | 408/35 X |
| 3,445,923 | 5/1969 | Balding | 29/568 |
| 3,691,899 | 9/1972 | Antonietto | 408/35 X |
| 3,999,769 | 12/1976 | Bayer et al. | 408/35 X |
| 4,103,405 | 8/1978 | Blum et al. | 29/26 A |
| 4,204,304 | 5/1980 | Eidam | 29/26 A |
| 4,223,579 | 9/1980 | Stark et al. | 408/35 |
| 4,316,071 | 2/1982 | Bonga | 219/69 R |
| 4,419,797 | 12/1983 | Sigloch et al. | 29/26 A |
| 4,419,807 | 12/1983 | Moulin | 29/568 |

FOREIGN PATENT DOCUMENTS 2816588 10/1978 Fed. Rep. of Germany ... 219/69 W

*Primary Examiner*—William R. Briggs
*Attorney, Agent, or Firm*—Hauke and Patalidis

[57] ABSTRACT

A tool changer for an EDM apparatus provided with a reciprocable machining head having a tool holder mounted on the end of the machining head. The tool changer comprises a rotatable indexable turret supporting a plurality of electrode tools each integrally provided with a support member for attachment of the electrode tool/support member assembly to the turret. Successive machining operations are effected by the machining head carrying an appropriate electrode tool, and at the end of each machining operation the electrode tool/support member assembly is attached to the turret.

4 Claims, 3 Drawing Figures

ELECTRODE TOOL STORAGE MAGAZINE

BACKGROUND OF THE INVENTION

The present invention relates to EDM apparatus provided with several electrode tools capable of being used in sequence.

It is known to provide EDM apparatus with an automatic tool changing mechanism, whereby the diverse electrode tools are stored in a magazine and a tool conveyor is provided between the magazine and the tool holder for carrying the electrode tools between the magazine and the tool holder and for returning the electrode tools to the magazine. For example, with the tools stored in a magazine such as a rotatable table, the tool conveyor system comprises, in general, a moving arm arranged such as to take a tool from the rotatable table and carry it to the tool holder of the machining head. After the tool has been installed on the tool holder, the moving arm must be retracted such as to clear the machining head to enable the electrode tool to be displaced to a position proximite the workpiece.

Tool conveyor systems and moving arms take much room and are a hindrance to designing a compact tool changer. In addition, known tool changers and conveyors must achieve motion of the tool along the three axes, which is a requirement that results in complex and costly devices.

SUMMARY OF THE INVENTION

The present invention has for principal object to eliminate the inconveniences of the prior art and to provide a very compact tool changer which may be placed proximate to the machining head of a machine tool such as an EDM apparatus.

One of the objects of the invention is to provide an EDM apparatus having a support member for a workpiece to be machined and a machining head, provided with an electrode tool, axially displaceable relative to the workpiece, the EDM apparatus comprising a rotatable table or turret for storing a variety of electrode tools, which requires no separate conveyor means for carrying the electrode tools from their stored position to the machining head and for returning the electrode tools from the machining head to the storage turret.

The apparatus of the invention is further characterized in that each electrode tool includes an integral support member in the form of a removable portion of the storage turret which remains attached to the electrode tool. The peripheral surface of the rotating turret to which is removably attached the electrode tool support member is located outside of the geometric projection of the machining head during reciprocation of the machining head, once the electrode tool is mounted on the tool holder on the machining head.

The many objects and advantages of the present invention will become apparent to those skilled in the art when the following description of an example of structure of apparatus according to the present invention, given for illustrative purpose only, is read in conjunction with the accompanying drawing wherein like numerals refer to like or equivalent parts and in which:

DETAILED DESCRIPTION OF THE PREFERRED EMBODIMENT

Figure 1:
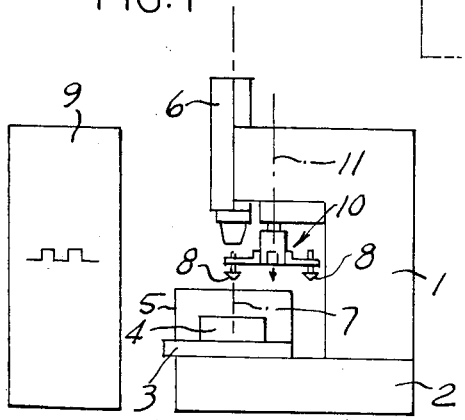
FIG. 1 is a schematic side elevation view of an EDM apparatus according to the present invention.

With reference to FIG. 1, an EDM apparatus according to the present invention comprises a frame 1 integral with, or attached to, a base 2 supporting a table 3 on which is mounted a workpiece 4. The workpiece 4, which is made of electrically conductive material, is immersed in a tank 5 filled with a machining fluid which is generally a dielectric liquid. The frame 1 carries at its top a machining head 6 which is reciprocable along a vertical axis 7 by appropriate servo control means, not shown. An electrode tool 8 is arranged to be removably mounted in a holder 6a affixed to the bottom of the machining head 6 for displacement by the machining head to a position proximate to the workpiece 4 prior to machining the workpiece 4 by electrical discharges, and for feeding the electrode tool into the workpiece by relative motion between the electrode tool 8 and the workpiece 4 during machining of the workpiece.

The machining current pulses are supplied by a generator 9 which is connected across the machining head 6 and the workpiece 4, as is well known in the EDM art.

The EDM apparatus has several electrode tools which are carried by a rotatable storage magazine or turret 10, supported in rotation around an axis 11 substantially parallel to the axis 7 of displacement of the machining head 6. The rotatable turret 10 is supported from the bottom of the frame 1 and is disposed proximate to the machining head 6.

Figure 2:
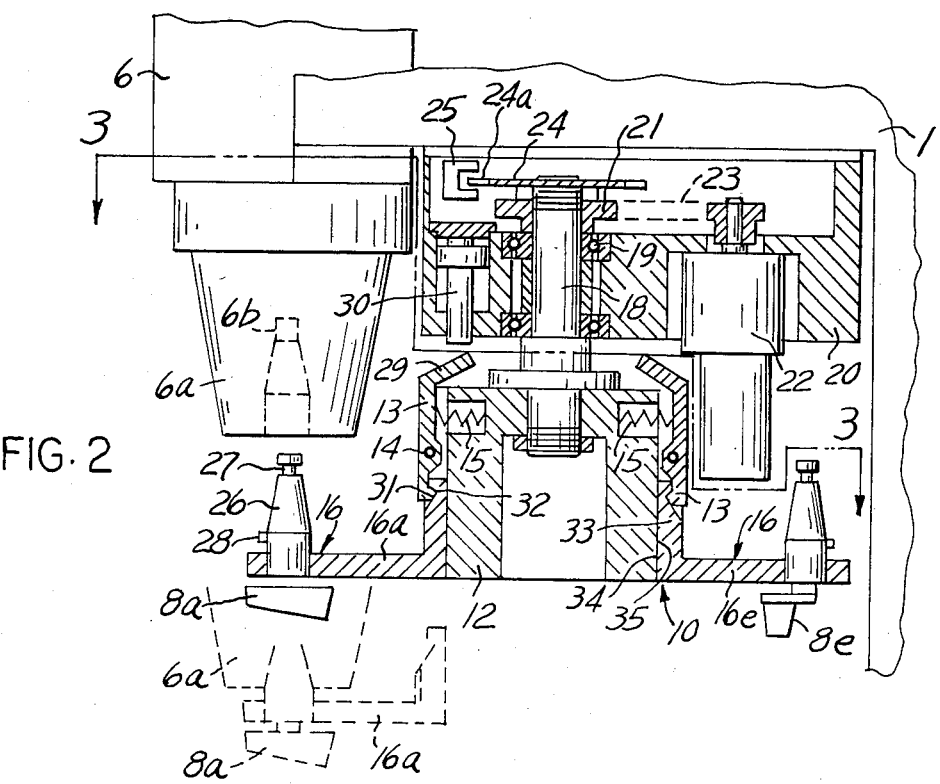
FIG. 2 is a view of a portion of FIG. 1 shown at a larger scale and with portions cut away for illustrating the internal structure.

As shown in more details at FIG. 2, the turret 10 comprises a central portion or spindle 12, generally bell-shaped, carrying on its periphery a plurality of generally vertically disposed clamping levers 13 pivotable around a pivot point 14 and biased to a clamping position by a spring 15. Each of the clamping levers 13 permits to hold, on the peripheral surface of the bell-shaped spindle 12 of the turret 10 a generally L-shaped support member 16 carrying an electrode tool 8. In the structure illustrated, there are eight electrode tools, 8a through 8h, mounted on the periphery of the turret bell-shaped spindle 12, each by way of a support member, 16a through 16h, integral with or fixedly attached to its corresponding electrode tool.

The turret bell-shaped spindle 12 is mounted on a shaft 18 journalled, via the intermediary of bearings 19, through a block 20 attached to the frame 1 of the EDM apparatus. The shaft 18 carries at its top a toothed wheel 21 for driving the shaft 18 in rotation and for angularly positioning the shaft 18 by means of a stepping electric motor 22, which drives the toothed wheel 21 keyed on the shaft 18 through a cog belt 23. A disk 24 is mounted on the end of the shaft 18. The disk 24 is provided with peripheral teeth or slits 24a angularly spaced such as to correspond each to the position of one of the support members 16a through 16h. The disk 24 co-operates with a reading transducer 25 detecting the diverse angular positions taken by the disk 24 when rotated and angularly positioned by the shaft 18.

FIG. 2 illustrates the machining head 6 in its raised position enabling tool changing. In the raised position of the machining head 6, an appropriate electrode tool 8, such as electrode tool 8a for example, is brought in register with the machining head 6 through appropriate indexing of the rotating turret 10. The machining head 6 is subsequently displaced downwardly such that the tool holder 6a carried at the bottom of the machining head 6, provided with tool holding means 6b in the form of a conical recess, not shown in detail but well known in the art, as disclosed in U.S. Pat. No. 4,316,071 for EDM Apparatus with Tool Changer, engages the mounting shank 26 of the electrode tool 8a. The mounting shank 26 is provided with a conical portion, a locking groove 27 co-operating with a locking member in the holding means 6b, and an angular position indexing finger 28 which, as a result of engaging a conforming keyway in the tool holder means 6b, enables the electrode tool 8a to be accurately indexed angularly relative to the tool holder 6a.

Figure 3:
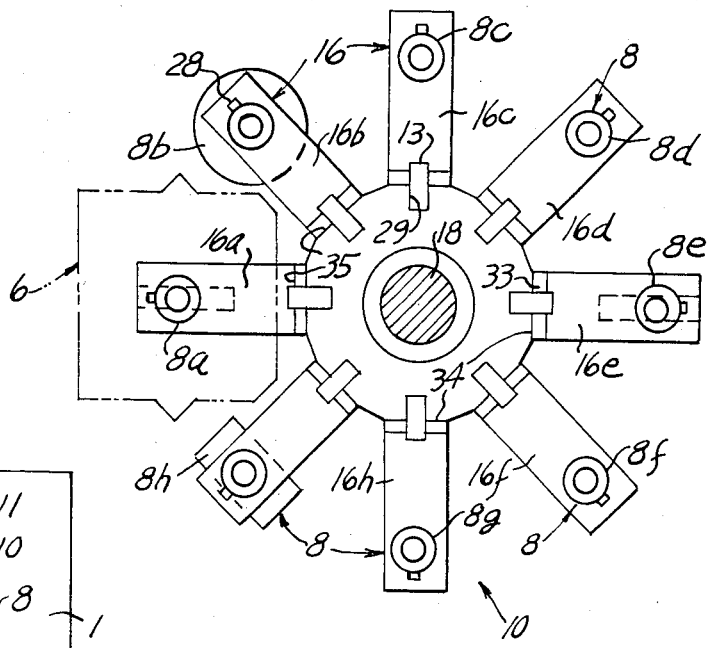
FIG. 3 is a top plan view, partly in section, from line 3—3 of FIG. 2.

After the preselected electrode tool 8a has been affixed in the tool holder 6a at the bottom of a machining head 6, the lever clamp 13 maintaining the tool support member 16a attached to the turret spindle 12 is released. For that purpose, the top end portion of each clamping lever 13 is bent over as shown at 29 to enable the clamping lever 13 to pivot around its pivot point 14 under the action of a fluid actuated plunger 30 reciprocably mounted in the block 20 proximate the machining head 6, and located such as to act upon the bent over portion 29 of the appropriate clamping lever 13 when an appropriate tool has been brought to its working position. The end of each clamping lever 13, opposite to its bent over end portion 29, is provided with appropriate interlocking pawl means 31 normally engaged with conforming interlocking means 32, in the form of a recess or groove for example, disposed on the surface of the upright portion 33 of each tool support member 16, proximate its upper edge, under the action of the spring 15. The upright portion 33 of the tool support member 16 has a surface 34 engaged with a mounting surface 35 on the periphery of the turret spindle 12. After the appropriate tool support member, 16a in the example of FIG. 2, is no longer attached to the spindle 12, the machining head 6 may be advanced to its working position, as shown in dashed line, carrying to the working position the electrode tool 8a and its attached support member 16a. It is to be noted that such a displacement is made possible as a result of the peripheral surface of the spindle 12, and more particularly the mounting surfaces 35, being situated outside of the geometric projection of the machining head 6 or, in other words, volume generated by the machining head 6 when it is displaced downwardly for bringing it in its working position, FIGS. 2 and 3.

After machining of the workpiece 4 with an appropriate electrode tool 8, such as electrode tool 8a, is concluded, the machining head 6 is retracted such as to bring the tool holder 6a to an appropriate position proximate to the rotatable turret 10 which, in the example of operation described, presents a vacant space on the spindle 12 corresponding to the tool support member 16a. In the course of the upward displacement of the machining head 6, the upright portion 33 of the tool support member 16a, provided at its edge with the interlocking means 32 is automatically engaged below the end of the clamp lever 13 which is provided with the interlocking pawl means 31 in the example of structure illustrated, such that the electrode tool 8a and its support member 16a are again attached to the spindle 12 as shown at FIG. 2, while the tool shank 26 is simultaneously freed and unlocked from the tool holder 6a.

The rotatable turret 10 can thus be rotated to index any appropriate electrode tool 8 relative to the machining head 6 and the tool holder 6a, so as to enable the appropriate electrode tool to be mounted in the tool holder 6a for effecting another machining operation on the workpiece 4.

It will be appreciated that diverse means may be used for attaching the electrode tools 8 to the spindle 12, such as for example, pincers or electro-magnetic chucks. It will also be appreciated that the present invention has many applications to machine-tools, other than EDM apparatus, provided with automatic tool changers.

Having thus described the present invention by way of a structural example thereof, modification whereof will be apparent to those skilled in the art, what is claimed as new is as follows:

1. In an EDM apparatus for effecting a machining operation on a workpiece, said EDM apparatus being provided with an automatic tool changer, said tool changer comprising a rotatable and indexable turret for supporting a plurality of electrode tools, and said EDM apparatus having a reciprocable machining head having a tool holder mounted on the end thereof, the improvement comprising a support member permanently attached to each of said electrode tools, said tool support member having a portion adapted to be removably attached to said turret, means for removably attaching said tool support member to said turret and for individually holding each said tool support member on said turret, said turret having a mounting surface for said tool support member portion, said mounting surface being located outside of the space occupied by said tool support member during reciprocation of said machining head with said electrode tool and tool support member attached to said tool holder, wherein said attaching and holding means comprise a clamping lever for each said tool support member, said clamping lever having pawl means co-operating with engaging means disposed on said tool support member portion for attaching said tool support member portion to said turret mounting surface during a retraction of said machining head from the workpiece causing engagement of said tool support member portion under said pawl means.

2. The improvement of claim 1 further comprising a fluid actuated plunger disposed in a fixed position proximate said machining head for actuating said clamping lever for detaching said tool support member from said turret after mounting said electrode tool on said tool holder.

3. In an apparatus for effecting a machining operation on a workpiece, said apparatus being provided with an automatic tool changer, said tool changer comprising a rotatable and indexable turret for supporting a plurality of tools, and said apparatus having a reciprocable machining head having a tool holder mounted on the end thereof, the improvement comprising a support member permanently attached to each of said tools, said tool support member having a portion adapted to be removably attached to said turret, means for removably attaching said tool support member to said turret and for individually holding each tool support member on said turret having a mounting surface for said tool support member portion, said mounting surface being located outside of the space occupied by said tool support member during reciprocation of said machining head with said tool and tool support member attached to said tool holder, wherein said attaching and holding means comprise a clamping lever for each said tool support member, said clamping lever having pawl means co-operating with engaging means disposed on said tool support member portion for attaching said tool support member portion to said turret mounting surface during a retraction of said machining head from the workpiece causing engagement of said tool support member portion under said pawl means.

4. The improvement of claim 3 further comprising a fluid actuated plunger disposed in a fixed position proximate said machining head for actuating said clamping lever for detaching said tool support member from said turret after mounting said tool on said tool holder.

* * * * *